Nov. 28, 1933.　　　R. W. LEACH　　　1,937,122
VALVE OR COCK
Filed March 14, 1932　　　4 Sheets-Sheet 1

Inventor
Robert William Leach
by his Attorneys:
English & Studwell

Nov. 28, 1933.   R. W. LEACH   1,937,122
VALVE OR COCK
Filed March 14, 1932    4 Sheets-Sheet 2

Inventor
Robert William Leach
by his Attorneys:-
English & Studwell

Nov. 28, 1933.   R. W. LEACH   1,937,122
VALVE OR COCK
Filed March 14, 1932    4 Sheets-Sheet 3
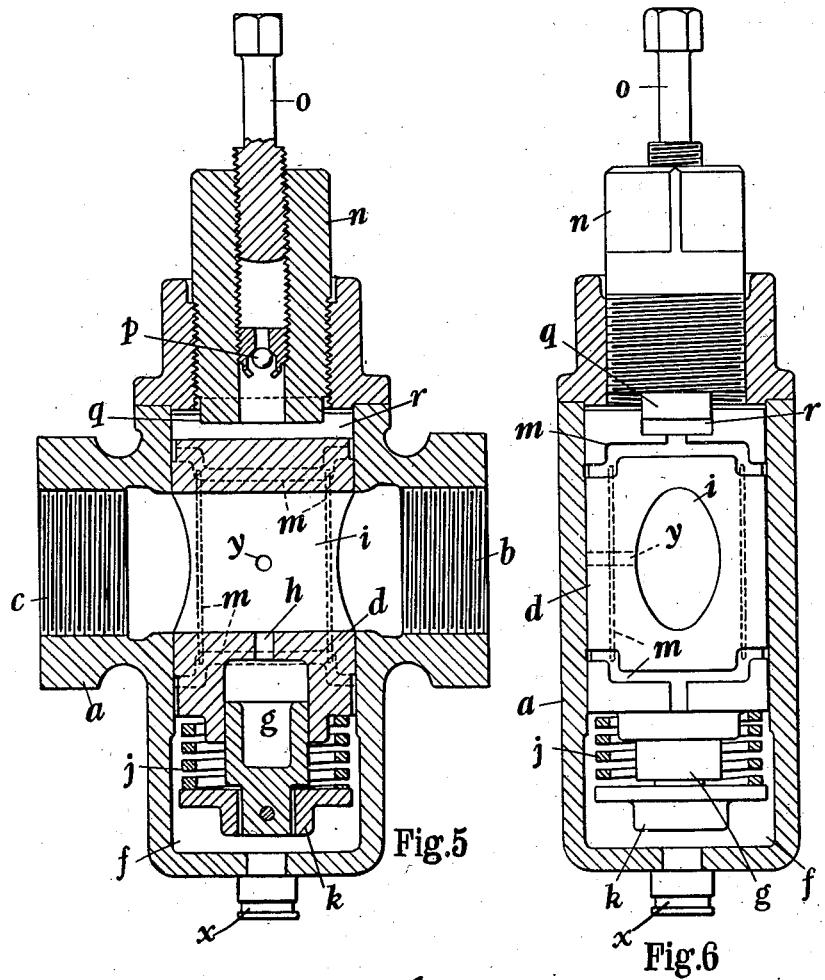
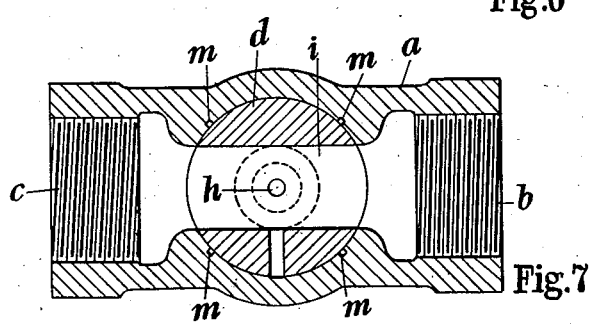
Inventor
Robert William Leach
by his Attorneys:-
English & Studwell Nov. 28, 1933. R. W. LEACH 1,937,122
VALVE OR COCK
Filed March 14, 1932 4 Sheets-Sheet 4
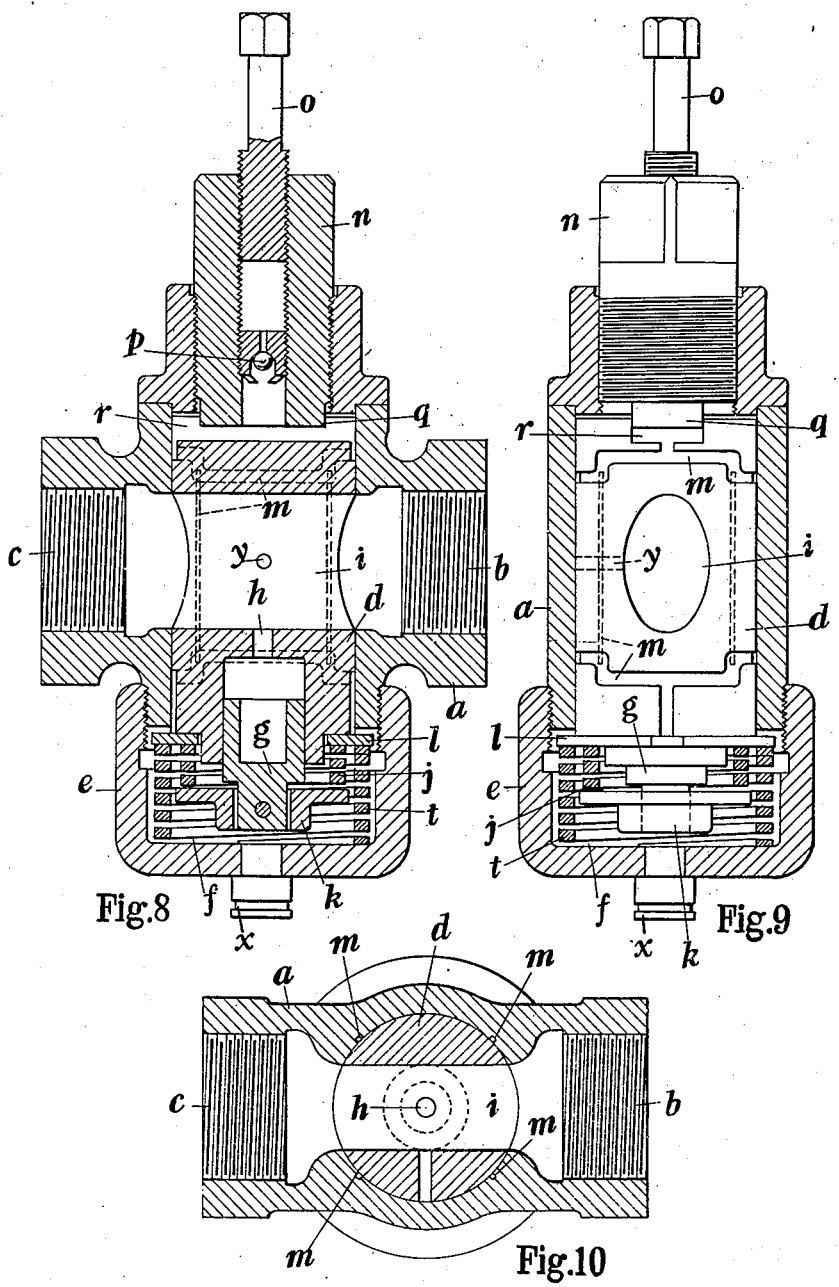

Patented Nov. 28, 1933

1,937,122

UNITED STATES PATENT OFFICE 1,937,122

VALVE OR COCK

Robert William Leach, Newport, England

Application March 14, 1932, Serial No. 598,705, and in Great Britain April 10, 1931

5 Claims. (Cl. 251—93)

This invention has for its object to provide valves or cocks of the rotary plug type in which improved means are provided for automatically lubricating or sealing the working surfaces.

The invention comprises the combination of a body part, a rotary plug within the body part, a lubricant reservoir adjacent to one end of the plug, a cylindrical cavity in one end of the plug communicating with the fluid passage, a piston slidable under fluid pressure within said cavity and adapted to exert pressure on the lubricant in the reservoir, a spring contained within the reservoir and adapted to act on the piston for exerting pressure on the lubricant, and channels in which lubricant or sealing substance is conveyed from the reservoir to the working surfaces of the valve under pressure in excess of that of the fluid controlled by the valve.

Also the invention comprises the combination with the plug, of a separate coaxially arranged operating stem, and a screw thread, or one or more packing rings, for preventing leakage of fluid past the stem, lubricating pressure being allowed to act on both ends of the plug.

Further the invention comprises an Oldham coupling device for interconnecting the separate stem and plug.

In the four accompanying sheets of explanatory drawings:—

Two further modifications are illustrated in sectional side elevation, sectional end elevation and sectional plan by Figures 5, 6 and 7 and by Figures 8, 9 and 10.

Figure 11:
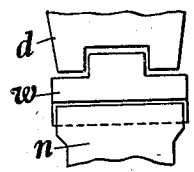

Figure 11 illustrates an Oldham coupling device which may be used for connecting the separate plugs and stems shown in Figures 3 and 4 or Figures 7-10.

Figures 1, 2:
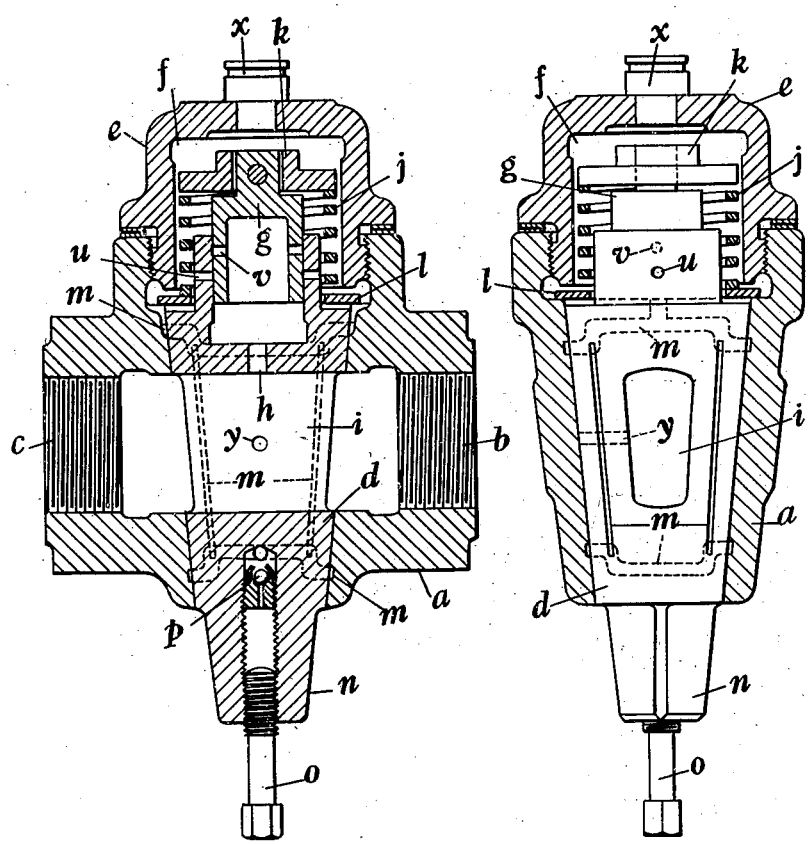
Figure 1 is a sectional side elevation and Figure 2 a sectional end elevation of one form of valve provided with this invention.
Figure 3:
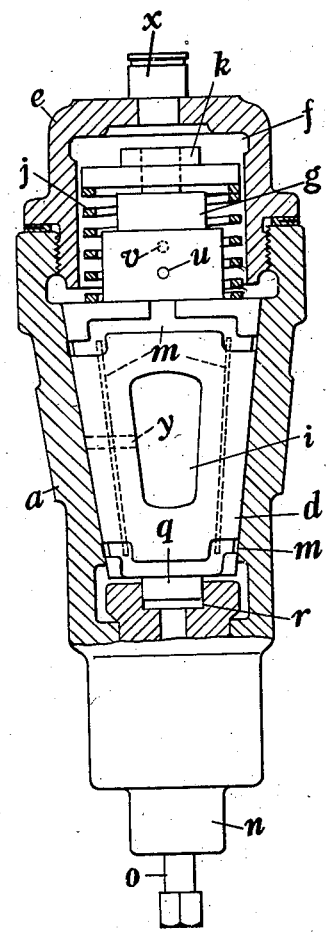
Figures 3 and 4 are respectively similar views to Figures 1 and 2 showing a modification.
Figure 4:
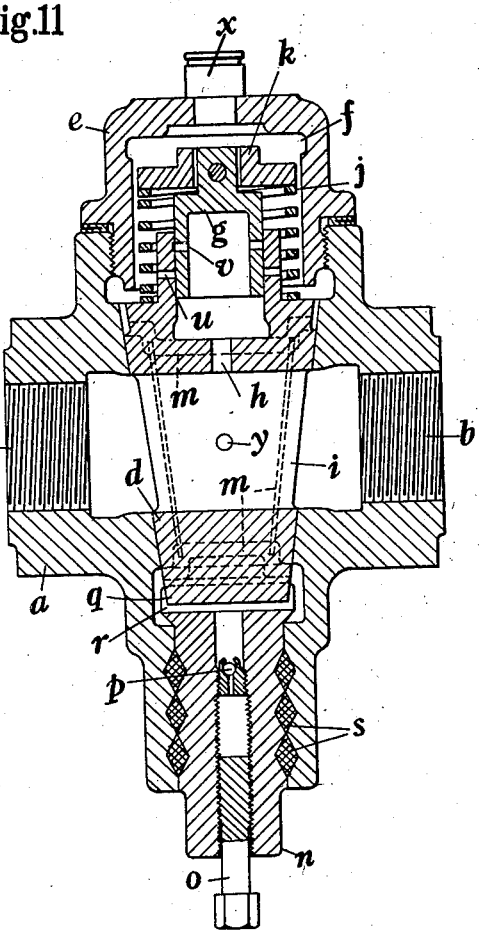

In carrying the invention into effect as shown in Figures 1 and 2, a body part $a$ having inlet and outlet passages $b$, $c$ is provided with a rotatable conical plug $d$. To the portion of the body part adjacent to the larger end of the plug is secured a hollow cap $e$, which together with the body part forms a lubricant reservoir $f$. The said larger end of the plug is shaped to form a cylinder in which is placed a slidable piston $g$ adapted to exert pressure on the lubricant in the reservoir when moved in the outward direction relatively to the cylinder. This movement is obtained by the action of pressure fluid which can enter the cylinder through a hole $h$ communicating with the main passage $i$ in the plug. To enable pressure fluid to gain access to the piston when the valve is closed, an extra hole $y$ is provided in the plug. Also the said movement of the piston is obtained by a spring $j$ contained wholly within the reservoir and arranged to act at one end on the piston, preferably through the medium of a plate or cross piece $k$ attached to the outer end of the piston. The other end of the spring may bear on a plate $l$ supported on a shoulder in the body, or it may bear as shown in Figures 3 and 4 directly on the plug.

Under the pressure exerted by the pressure fluid and spring, the lubricant is forced as required into channels $m$ which convey the lubricant to the working surfaces of the valve. In the examples illustrated the channels $m$ are so disposed that they completely surround the main passage through the valve and ensure proper sealing of the plug in either its open or closed position.

In Figures 1 and 2 the circumferential channels are provided in the body, and the longitudinal channels in the plug, but the reverse of this arrangement may be employed and is shown in Figures 3–10. Moreover the circumferential channels are stepped so that the ends of the longitudinal channels only communicate with them in certain positions of the plug as shown.

To allow excess lubricant to escape into the interior of the valve when the reservoir is fully charged, I may provide holes $u$, $v$ in the plug and piston. These holes coincide when the reservoir is full.

Actuation of the plug may be effected by a stem $n$ extending beyond the body part from the end of the plug opposite to that containing the piston. This stem may be formed integrally with the plug as shown. The stem may also be used for the purpose of charging the reservoir with lubricant. In this case a screw threaded chamber is formed in the stem, and is closed by a removable screw $o$. Lubricant introduced into the chamber can by means of the screw be forced past the non-return valve $p$ along the channels $m$ to the reservoir. If desired lubricant may be introduced directly through the cap $e$ or indirectly through the hollow stem by means of a separate grease gun which forces the lubricant through a nipple containing a valve, the nipple being attached to the cap or stem. For example, the grease gun nipple $x$ is attached to the cap and employed for filling the reservoir. This feature may be used instead of the device shown in the stem and may be applied to all the forms of valves described below, or may be omitted from any of them.

Preferably the stem $n$ is made separately from the plug, the connection being effected either, as shown in the modification illustrated in Figures 3 and 4, by a transverse tongue $q$ on one of the parts engaging a corresponding slot $r$ in the other part, or by an intermediate element $w$ forming an Oldham coupling between the plug and stem as shown in Figure 11. By thus separating the stem and plug and allowing a sufficient freedom between them, any small lack of alignment between the body parts cooperating with the plug and stem is automatically compensated and interference with proper contact of the plug with the body part, or any tendency to binding which might otherwise be set up, is effectually avoided. Leakage of fluid past the stem may be prevented, as shown in Figures 3 and 4, by the provision of one or more metal packing rings $s$ arranged in grooves formed around the stem and within the body part, these rings being preferably cast in position. The surfaces of the grooves are suitably inclined, so that any axial pressure on the stem tends to set up a wedging action in the packing rings. Alternatively the required prevention of leakage may be effected by providing a screw thread connection between the stem and body part, (when the stem is made separately from the plug) as shown in Figures 5—10, the small axial movement which occurs with a normal rotational movement of the stem being accommodated by the connection between the plug and stem.

Where the operating stem is separate from the plug (whether conical or cylindrical) lubricant under pressure acts on both ends of the plug. The fluid pressures acting on the plug are therefore substantially balanced and risk of binding of the plug within the body part is thus obviated. Further the total pressure acting on the lubricant is by reason of the spring greater than the pressure of the fluid controlled by the valve; consequently the lubricant forms an effective seal for preventing leakage of fluid past the working surfaces of the valve.

I desire it to be understood that the term lubricant is used by me in this specification as including any fluid or plastic substance which it may be required to use. For some purposes the lubricating property of the substance is less important than its ability to form a fluid tight seal between the working surfaces, and in certain special cases the substance may be chosen entirely for its suitability as a sealing agent.

Referring to the modifications illustrated in Figures 5—10, these are essentially similar to the valves illustrated in Figures 1—4 and differ mainly in that the plug is cylindrical instead of conical. In Figures 5 to 7 the lubricant reservoir $f$ is formed integrally with the body part, and the spring $j$ acts on the plug as well as on the plate $k$. The operating stem $n$ is made separately from the plug as already described, and a fluid tight joint between the stem and the body part is obtained by screw threading both of the said parts in the manner already mentioned. In Figures 8 to 10 the reservoir is formed by a cap $e$ on the body, and the spring $j$ is supplemented by an extra spring $t$. At one end one of the springs bears against the plate $k$, whilst the other bears against the cap. At the other end both springs bear on a plate $l$ which is supported on the plug and may be formed with peripheral projections which engage notches in the body to prevent rotation of the plate with the plug.

By this invention I am able to arrange for the automatic lubrication or sealing of the working surfaces of valves in a very simple and convenient manner. By the combined actions of the spring or springs and fluid pressure, the lubricant is maintained at a higher pressure than that of the fluid controlled by the valve, and this together with the above described disposition of the lubricant channels enables me effectively to prevent leakage of fluid past the working surfaces.

Having thus described my invention what I claim as new and desire to secure by Letters Patent is:—

1. In valves or cocks of the type specified, the combination of a body part, a rotary plug within the body part, a lubricant reservoir adjacent to one end of the plug, a cylindrical cavity in one end of the plug communicating with the fluid passage, a piston slidable under fluid pressure within said cavity and adapted to exert pressure on the lubricant in the reservoir, a spring contained within the reservoir and adapted to act on the piston for exerting pressure on the lubricant, and channels in which lubricant is conveyed from the reservoir to the working surfaces of the valve under pressure in excess of that of the fluid controlled by the valve, substantially as described.

2. In valves or cocks having the features claimed in claim 1, the channels being arranged in positions surrounding the main fluid passage through the valve and thereby ensuring prevention of leakage of fluid past the working surfaces in both the open and closed positions, substantially as described.

3. In valves or cocks as claimed in claim 1, the combination with the plug, of a separate coaxially arranged operating stem, and means for preventing leakage of fluid past the stem, lubricant pressure being allowed to act on both ends of the plug, substantially as described.

4. In valves or cocks as claimed in claim 1, the provision in the piston and the adjacent cylinder, of apertures permitting escape of lubricant into the valve interior when the reservoir is fully charged, substantially as described.

5. In valves or cocks as claimed in claim 1, the combination in which the channels are arranged in positions surrounding the main fluid passage through the valve, thereby ensuring prevention of leakage of fluid past the working surfaces in both the open and closed positions, further characterized by the combination with the plug and operating stem, of an Oldham coupling device for interconnecting the said parts, substantially as described.

ROBERT WILLIAM LEACH.